(12) United States Patent
Kim et al.

(10) Patent No.: US 8,194,729 B2
(45) Date of Patent: Jun. 5, 2012

(54) APPARATUS AND METHOD FOR MATCHING COMPRESSED VIDEO DATA UNDER WIRELESS FADING ENVIRONMENT

(75) Inventors: Chan-Yul Kim, Bucheon-si (KR);
Jeong-Rok Park, Hwaseong-si (KR);
Young-Hun Joo, Yongin-si (KR);
Yun-Je Oh, Yongin-si (KR)

(73) Assignee: Samsung Electronics Co., Ltd., Maeton-dong, Yeongtong-gu, Suwon-si, Gyeonggi-do (KR)

( * ) Notice: Subject to any disclaimer, the term of this patent is extended or adjusted under 35 U.S.C. 154(b) by 1547 days.

(21) Appl. No.: 11/652,336

(22) Filed: Jan. 11, 2007

(65) Prior Publication Data

US 2007/0195893 A1 Aug. 23, 2007

(30) Foreign Application Priority Data

Feb. 17, 2006 (KR) .................. 10-2006-0015552

(51) Int. Cl.
*H04N 11/02* (2006.01)
*H04B 17/00* (2006.01)
*H04B 15/00* (2006.01)

(52) U.S. Cl. .............. 375/240; 375/240.13; 375/240.26; 375/240.27; 375/254; 375/342; 455/67.13; 455/69; 455/501; 455/522

(58) Field of Classification Search .......... 375/240.26–240.27, 240; 455/67.13, 455/501
See application file for complete search history.

(56) References Cited

U.S. PATENT DOCUMENTS

| 6,434,130 B1 * | 8/2002 | Soininen et al. ............. 370/331 |
| 6,714,520 B1 * | 3/2004 | Okamura ...................... 370/286 |
| 2002/0099529 A1 * | 7/2002 | Tang ............................... 703/22 |
| 2002/0111144 A1 * | 8/2002 | Schiff ............................. 455/69 |
| 2003/0112879 A1 * | 6/2003 | Antia et al. .................. 375/259 |
| 2003/0133497 A1 * | 7/2003 | Kinjo et al. ................... 375/152 |
| 2004/0120299 A1 * | 6/2004 | Kidiyarova-Shevchenko et al. ............................. 370/342 |
| 2004/0198404 A1 * | 10/2004 | Attar et al. .................... 455/522 |
| 2004/0224677 A1 * | 11/2004 | Kuchibhotla et al. ....... 455/422.1 |
| 2004/0267983 A1 * | 12/2004 | Oda ................................ 710/56 |
| 2005/0235178 A1 * | 10/2005 | Starr et al. .................... 714/704 |

(Continued)

FOREIGN PATENT DOCUMENTS

JP 07-307677 11/1995

(Continued)

*Primary Examiner* — Christian Laforgia
*Assistant Examiner* — Jenise Jackson
(74) *Attorney, Agent, or Firm* — Cha & Reiter, LLC

(57) ABSTRACT

A method and apparatus for matching compressed video data under a wireless fading environment are disclosed. The apparatus includes an encoder for encoding and outputting the video data as a compressed bit stream, a channel error measurement unit for measuring Signal-to-Noise Ratio (SNR) or Carrier-to-Noise Ratio (CNR) of a wireless channel, and an encoder optimization module for determining if the current fading is slow fading or fast fading. A control signal is output to reduce a frame transmission ratio or to change the quality of the vide data if it is determined that the current fading is slow fading. Another control signal is output to adjust the size of a data output buffer of the wireless channel if it is determined that the current fading is fast fading. The apparatus also includes a temporal Scalable Video Coding (SVC) selector 24 and an SNR SVC selector 22 for selecting the frame transmission ratio or the bit rate according to the control signal output from the encoder optimization module, to provide a frame selection signal or a bit rate selection signal to the encoder.

8 Claims, 4 Drawing Sheets

U.S. PATENT DOCUMENTS

| | | | |
|---|---|---|---|
| 2006/0166691 A1* | 7/2006 | Medrano | 455/522 |
| 2007/0147485 A1* | 6/2007 | Sakamoto et al. | 375/219 |
| 2007/0274381 A1* | 11/2007 | Li et al. | 375/240.01 |
| 2008/0037624 A1* | 2/2008 | Walker et al. | 375/240.01 |
| 2011/0044394 A1* | 2/2011 | Wu et al. | 375/267 |

FOREIGN PATENT DOCUMENTS

| | | |
|---|---|---|
| JP | 2005-012321 | 1/2005 |
| KR | 1999-010398 | 2/1999 |
| KR | 2001-99772 | 11/2001 |

* cited by examiner

APPARATUS AND METHOD FOR MATCHING COMPRESSED VIDEO DATA UNDER WIRELESS FADING ENVIRONMENT

CLAIM OF PRIORITY

This application claims priority to application entitled "Apparatus And Method For Matching Compressed Video Data Under Wireless Fading Environment," filed with the Korean Intellectual Property Office on Feb. 17, 2006 and assigned Serial No. 2006-15552, the contents of which are incorporated herein by reference.

BACKGROUND OF THE INVENTION

1. Field of the Invention

The present invention relates to technology for coding and transmitting video data through a wireless channel, and more particularly to an apparatus and method for matching compressed video data in a wireless fading environment.

2. Description of the Related Art

When multimedia data including video and audio data is transmitted through a wireless channel, the receiving side may detect data errors in the multimedia data due to a time varying characteristic of the wireless channel. This causes the transmitted video and audio data to be deteriorated. In other words, the wireless channel is frequently subjected to fast fading and slow fading due to a multi-path, an environmental factor, and the movement of a terminal, etc. A conventional multimedia transmission scheme and a codec interface scheme have been proposed for improving the transmission quality in such a wireless environment.

FIG. 1 is a block diagram showing an apparatus for matching compressed video data under a general wireless environment. The apparatus includes an encoder 10 for encoding the video data to output compressed bit stream, a streamer 12 for processing the compressed bit stream output from the encoder 10 to generate a transmission stream, and an MAC/PHY unit 14 for creating MAC frames at a Medium Access Control layer using the transmission stream generated from the streamer 12 and converting the MAC frames into analog signals to transmit the converted MAC frames through a network, i.e. a transmission medium (wireless medium). The apparatus also includes a channel-error measurement unit 16 for measuring Signal-to-Noise Ratio (SNR) or Carrier-to-Noise Ratio (CNR) in the MAC/PHY unit 14 (in the case of FIG. 1, CNR is measured), an error ratio calculation unit 18 for calculating Bit Error Ratio (BER) or Frame Error Ratio (FER) using SNR or CNR measured by the channel-error measurement unit 16, and a temporal Scalable Video Coding (SVC) selector 24 and SNR SVC selector 22 for identifying BER or FER calculated by the error ratio calculation unit 18 and selecting a frame per rate or a bit ratio suitable for transmitting the multimedia, especially the video data, to provide a frame selection signal or a bit ratio selection ratio to the encoder 10.

In FIG. 1, the encoder 10 is configured and operates as a general H.264/Advanced Video Coding (AVC) encoder. The encoder 10 includes a motion estimation unit 110, a motion compensation unit 120, an intra prediction-mode selection unit 170, an intra prediction unit 190, a subtraction unit 130, a Discrete Cosine Transformation (DCT) unit 140, a quantization unit 150, a reordering unit 160, an entropy encoder 165, an inverse quantization unit 155, an inverse DCT transformation unit 145, an addition unit 135, and a filter 180.

The encoder 10 includes two data flow pathways, one of which is a forward pathway proceeding from the left side to the right side and the other which is a reconstruction pathway proceeding from the right side to the left side in FIG. 1.

First, the forward pathway will be described. A current input picture (frame) 101 is provided for prediction-encoding. The frame 101 is processed by units of macro-blocks corresponding to the original image of 16×16 pixels. Each macro-block is encoded in an intra-mode or an inter-mode. In the intra-mode or inter-mode, the prediction macro-block P is created, based on a reconstructed frame.

In the inter-mode, the prediction macro-block P is created in such a manner that the motion estimation unit 110 presumes the motion of one or more reference frames 102, and the motion compensation unit 120 compensates the motion of the reference frames 102. The reference frame 102 may be one or more previous frames that have been already encoded and reconstructed.

In the intra-mode, the prediction macro-block P is formed from samples of the current frame 101, i.e. frame output from the addition unit 135, which is currently encoded, decoded, and reconstructed. The intra prediction unit 190 predicts the block of each macro-block in a preset scan order. The intra prediction-mode selection unit 170 selects the best suitable prediction mode according to the order of scanning the block of the macro-block to be currently encoded from the reconstructed current frame, and the intra prediction unit 190 carries out the intra predictions according to the selected prediction mode.

The subtraction unit 130 creates a difference macro-block between the current macro-block and the prediction macro-block P. The created macro-block is DCT-transformed by the transform unit 140, and then quantized by the quantization unit 150 to create a quantized transformation coefficient X. The output of the quantization unit 150 is provided through the reordering unit 160 to the entropy encoder 165. The compressed bit stream output from the entropy encoder 165 is provided through a Network Abstraction Layer (NAL) to a streamer 12 that transmits or stores the compressed bit stream.

Next, the reconstruction pathway will be described. The quantized transformation coefficient X is inversely quantized by the inverse-quantization unit 155, and then inversely DCT-transformed by the inverse transform unit 145 to create an inverse difference macro-block. This block is not identical with the original difference macro-block due to signal loss, etc.

The prediction macro-block P is merged with the inverse difference macro-block by the addition unit 135, to create the reconstructed macro-block. Such a reconstructed macro-block is a distorted version of the original macro-block. The filter 180 reduces the distortion to create the reconstructed frame 103, which in turn can be used as a criteria frame 102.

The conventional apparatus shown in FIG. 1 first detects the CNR or SNR through the MAC/PHY of a wireless channel in order to transmit multimedia data in a wireless environment. The BER or FER is estimated using the obtained CNR or SNR. If the estimated BER is lacking in transmitting the multimedia data, especially video data, the quality of the video data is degraded to reduce the bit rate or frame per rate. When apparatus is applied to a home network or a car network, it is possible to construct the multimedia apparatus that has reduced sensitivity to the fading change of the wireless channel because the change of the wireless channel is not serious. However, the apparatus shown in FIG. 1 cannot cope with a fast moving portable terminal, i.e. the change of the channel due to the rapid change of the environment.

SUMMARY OF THE INVENTION

Accordingly, one aspect of the present invention has been made to solve the above-mentioned problems occurring in the prior art. Another aspect of the present invention is to provide an apparatus and method for matching compressed video data in a wireless fading environment, which can stably transmit multimedia data while satisfying the transmission quality in a wireless environment.

One embodiment of the present invention is directed to an apparatus for matching compressed video data under a wireless fading environment. The apparatus includes an encoder for encoding and outputting the video data as a compressed bit stream; a channel error measurement unit for measuring Signal-to-Noise Ratio (SNR) or Carrier-to-Noise Ratio (CNR) of a wireless channel; and an encoder optimization module for determining if a current fading is slow fading or fast fading. The encoder optimization module outputs a control signal to reduce a frame transmission ratio or to change the quality of the video data if it is determined that the current fading is slow fading, and outputs another control signal to adjust the size of a data output buffer of the wireless channel if it is determined that the current fading is fast fading. The apparatus also includes a temporal Scalable Video Coding (SVC) selector 24 and an SNR SVC selector 22 for selecting the frame transmission ratio or the bit rate according to the control signal output from the encoder optimization module, to provide a frame selection signal or a bit rate selection signal to the encoder.

Another embodiment of the present invention is directed to a method for matching compressed video data under a wireless fading environment. The method includes the steps of periodically measuring SNR or CNR of a wireless channel; calculating BER or FER using the measured SNR or CNR; comparing a variation of the calculated BER or FER per unit time with a preset threshold; and increasing the size of the data output buffer of the wireless channel if the variation of the BER or FER per unit time is larger than the threshold as a result of the comparison.

BRIEF DESCRIPTION OF THE DRAWINGS

The above and other aspects, features, and embodiments of the present invention will be more apparent from the following detailed description taken in conjunction with the accompanying drawings, in which.

DETAILED DESCRIPTION

Hereinafter, embodiments of the present invention will be described in detail with reference to the accompanying drawings. The detailed description of the structural elements only is disclosed to help in understanding the present invention overall. It is obvious to those skilled in the art that the structural elements may be changed or modified within the scope of the present invention.

Figure 2:
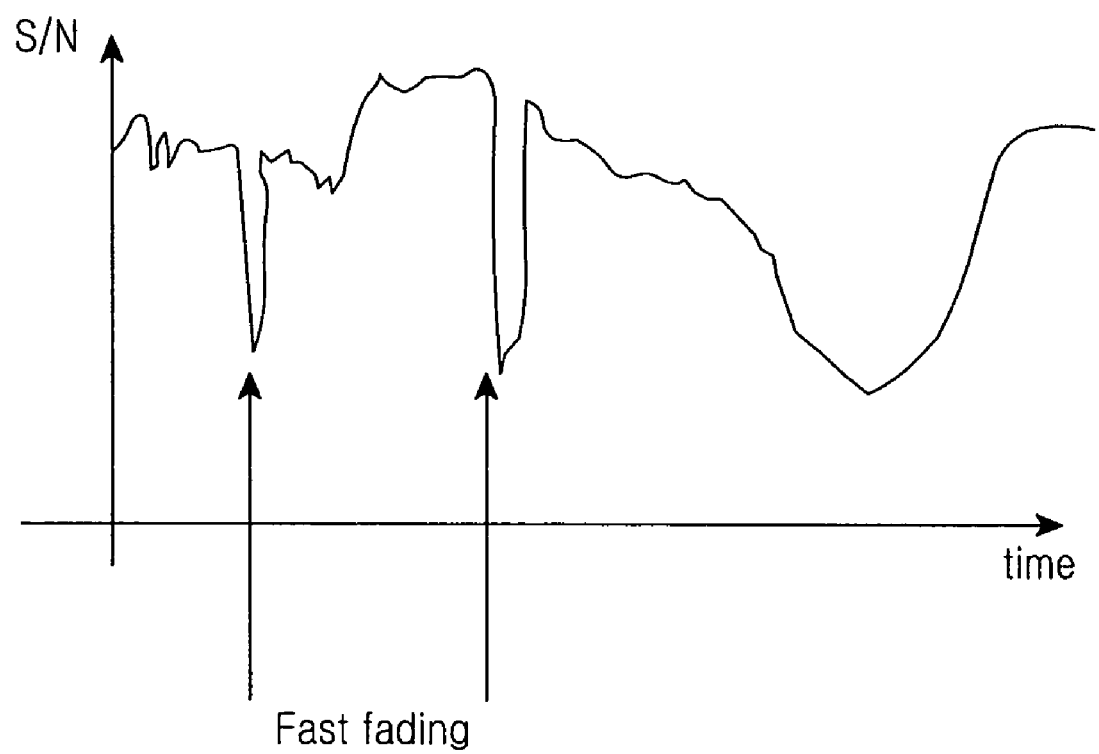
FIG. 2 is a graph illustrating a Signal-to-Noise characteristic of a wireless channel.

A wireless environment has a complicated channel characteristic in which the bandwidth of a channel is changed according to time and space. Therefore, video data transmitted through a wireless channel mainly is in the form of a file, or a low definite image of 64 kbps. Services such as broadband wireless Internet make it possible to provide the broadband service to users. It is substantially impossible, however, to provide a service with the constant quality under a condition which is changed according to time and space. It is difficult to normally transmit video data in a region in which Signal-to-Noise Ratio (SNR) is rapidly changed according to time, as shown in FIG. 2.

According to one embodiment of the present invention, if it is determined that the current fading is slow fading, the frame transmission ratio is reduced by a temporal coding, or the quality of the video is changed by an SNR coding to result in the reduction of bandwidth to be transmitted. Further, if it is determined that the current fading is fast fading as shown in FIG. 2, the size of a data output buffer is adjusted so that the fast fading is compensated by using the size of the data output buffer.

Figure 3:
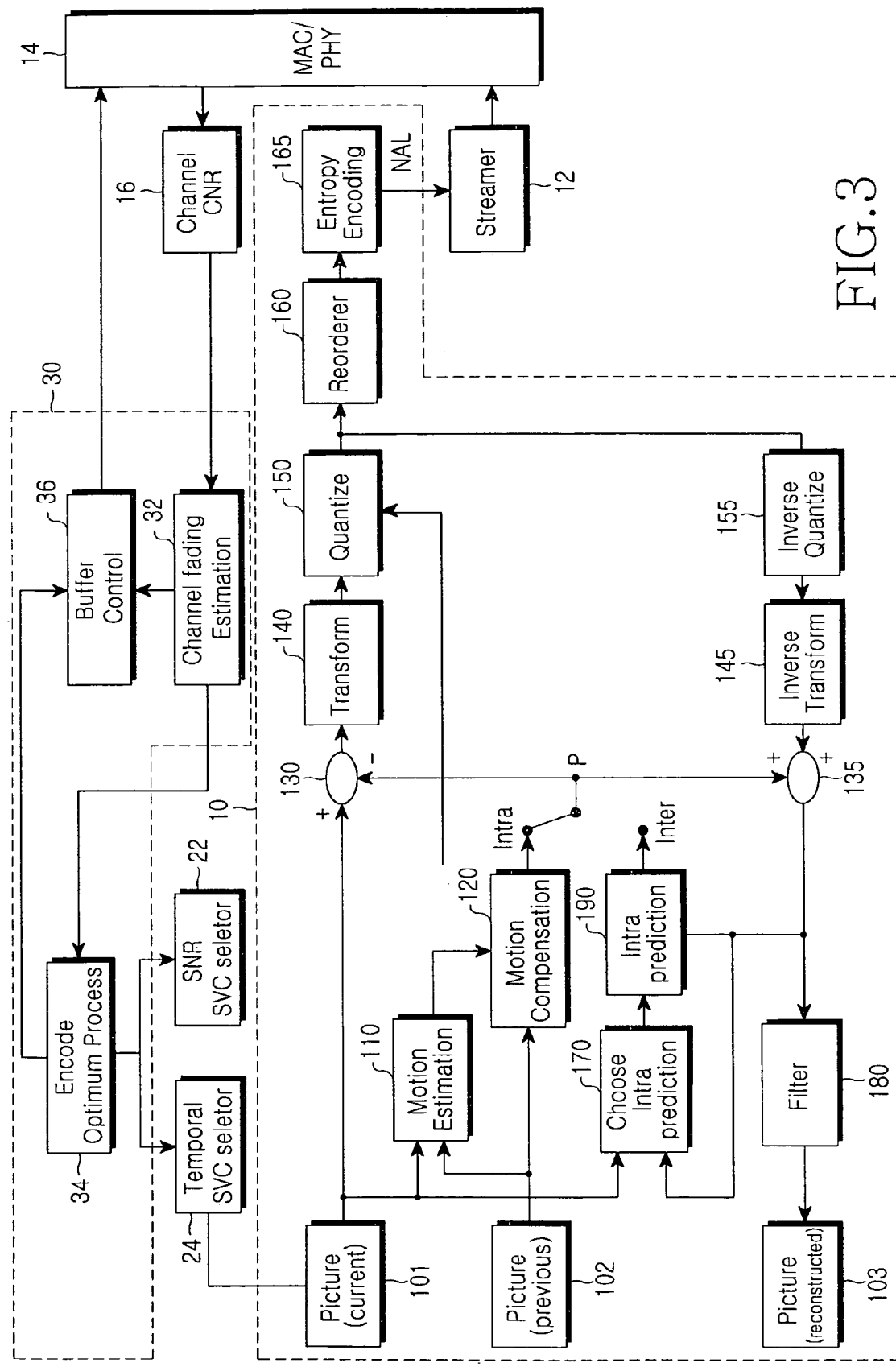
FIG. 3 is a block diagram illustrating an apparatus for matching compressed video data under a wireless environment according to an embodiment of the present invention.

FIG. 3 is a block diagram showing an apparatus for matching the compressed video data in the wireless environment according to an embodiment of the present invention. Referring to FIG. 3, the apparatus includes an encoder 10 for encoding the video data to output the encoded video data as a compressed bit stream, a streamer 12 for processing the compressed bit stream output from the encoder 10 to generate a transmission stream, and a MAC/PHY layer 14 for generating MAC frames using the transmission stream generated from the streamer 12 in a Medium Access Control (MAC) layer and then converting the MAC frames into analog signals in a Physical (PHY) layer, to transmit the analog signals through a network, i.e. a wireless transmission medium, etc. The apparatus also includes a channel error measurement unit 16 for measuring Signal-to-Noise Ratio (SNR) or Carrier-to-Noise Ratio of a channel in the MAC/PHY layer 14 (measuring CNR in FIG.), and an encoder optimization module 30 for determining if the current fading is slow fading or fast fading, using the SNR or CNR measured by the channel error measurement unit 16. A control signal may be output in order to reduce a frame transmission ratio or to change the quality of the video data if the current fading is slow fading. A control signal may be output to adjust the size of the data output buffer of the MAC/PHY layer 14 if the current fading is fast fading. The apparatus further includes a temporal Scalable Video Coding (SVC) selector 24 and an SNR SVC selector 22 for selecting the frame transmission ratio or the bit ratio suitable for transmitting the multimedia data, especially video data, to provide a frame selection signal or a bit ratio selection signal to the encoder 10, according to the control signal output from the encoder optimization module 30.

Figure 1:
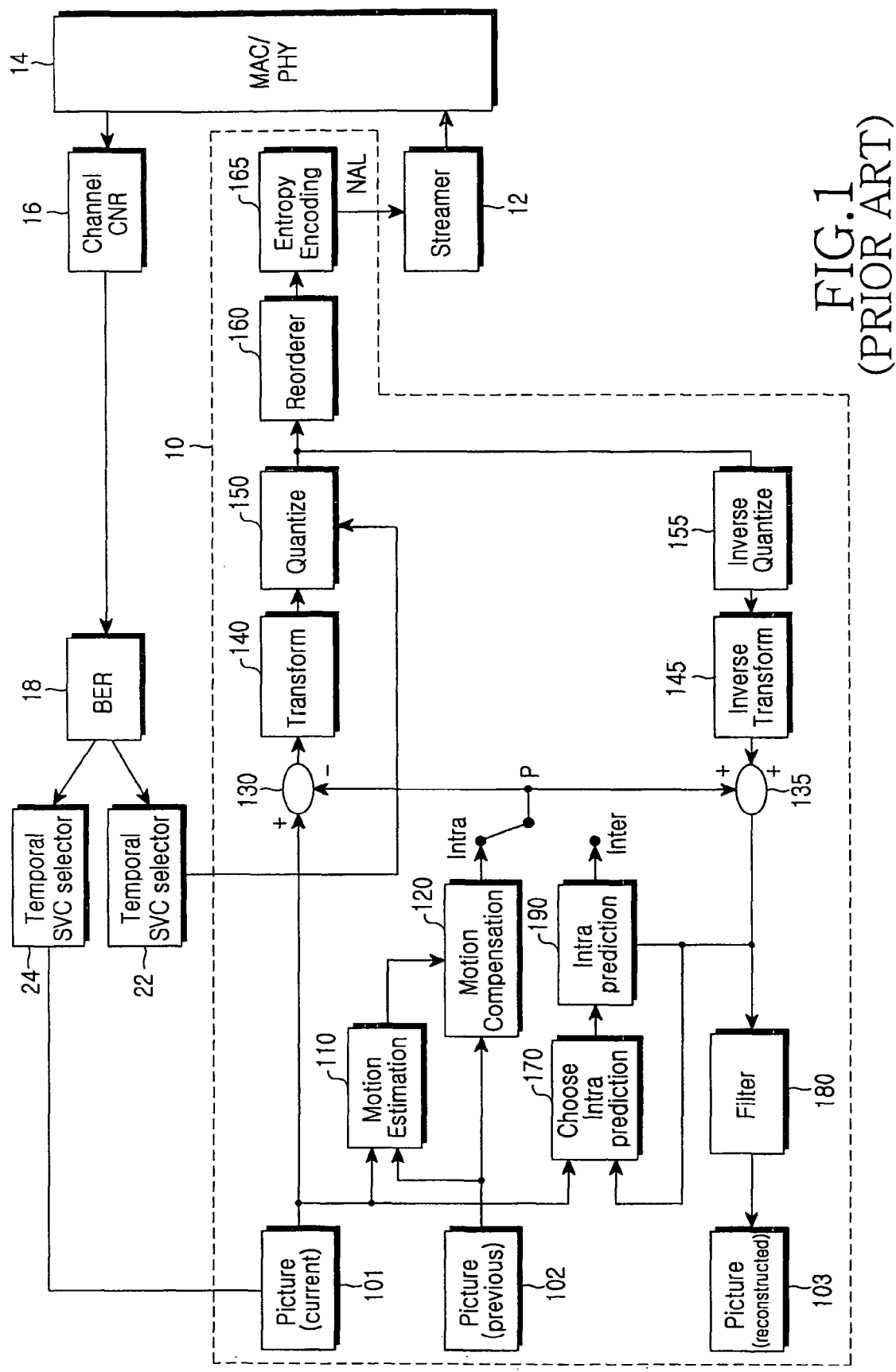
FIG. 1 is a block diagram illustrating an apparatus for matching compressed video data under a conventional wireless environment.

The encoder 10 may be configured to operate as a general H.264/Advanced Video Coding (AVC) encoder. In the embodiment shown in FIG. 3, the encoder 10 includes a motion estimation unit 110, a motion compensation unit 120, an intra prediction-mode selection unit 170, an intra prediction unit 190, a subtraction unit 130, a Discrete Cosine Transformation (DCT) unit 140, a quantization unit 150, a reordering unit 160, an entropy encoder 165, an inverse quantization unit 155, an inverse DCT transformation unit 145, an addition unit 135, and a filter 180. Some elements of the encoder 10 have the same configuration and operation as those of the conventional encoder 10 shown in FIG. 1 and will not be discussed in detail again. Further, the streamer 12, the MAC/PHY 14, the channel error measurement unit 16, the temporal SVC selector 24 and the SNR SVC selector 22, excepting for the encoder optimization module 30 may have the same configuration and operation as the conventional ones and will also not be discussed in detail again.

In more detail, the encoder optimization module 30 includes a channel fading estimation unit 32 for receiving the SNR or CNR measured by the channel error measurement unit 16 to calculate the BER or FER. It is determined that the current fading is fast fading when the variation of the BER or FER is larger than a preset threshold. It is determined that the current fading is slow fading when the variation of the BER or FER is smaller than the preset threshold. The encoder optimization module 30 also includes a buffer controller 36 for outputting a buffer control signal to control the size of the data output buffer of the MAC/PHY 14, and an encoder optimization controller 32 for outputting a control signal to reduce the frame transmission ratio or to change the quality of the video data if the channel fading estimation unit 32 determines that the current fading is slow fading (in this case, the control signal may be the BER or FER which is simply calculated), and outputting a control signal to the buffer controller 26 in order to adjust the size of the data output buffer of the MAC/PHY 14 if the channel fading estimation unit 32 determines that the current fading is fast fading. The temporal SVC selector 24 and the SNR SVC selector 22 identify the BER or FER provided to the encoder optimization controller 32, and provide the suitable frame selection signal or bit ratio selection signal to the encoder 10.

Figure 4:
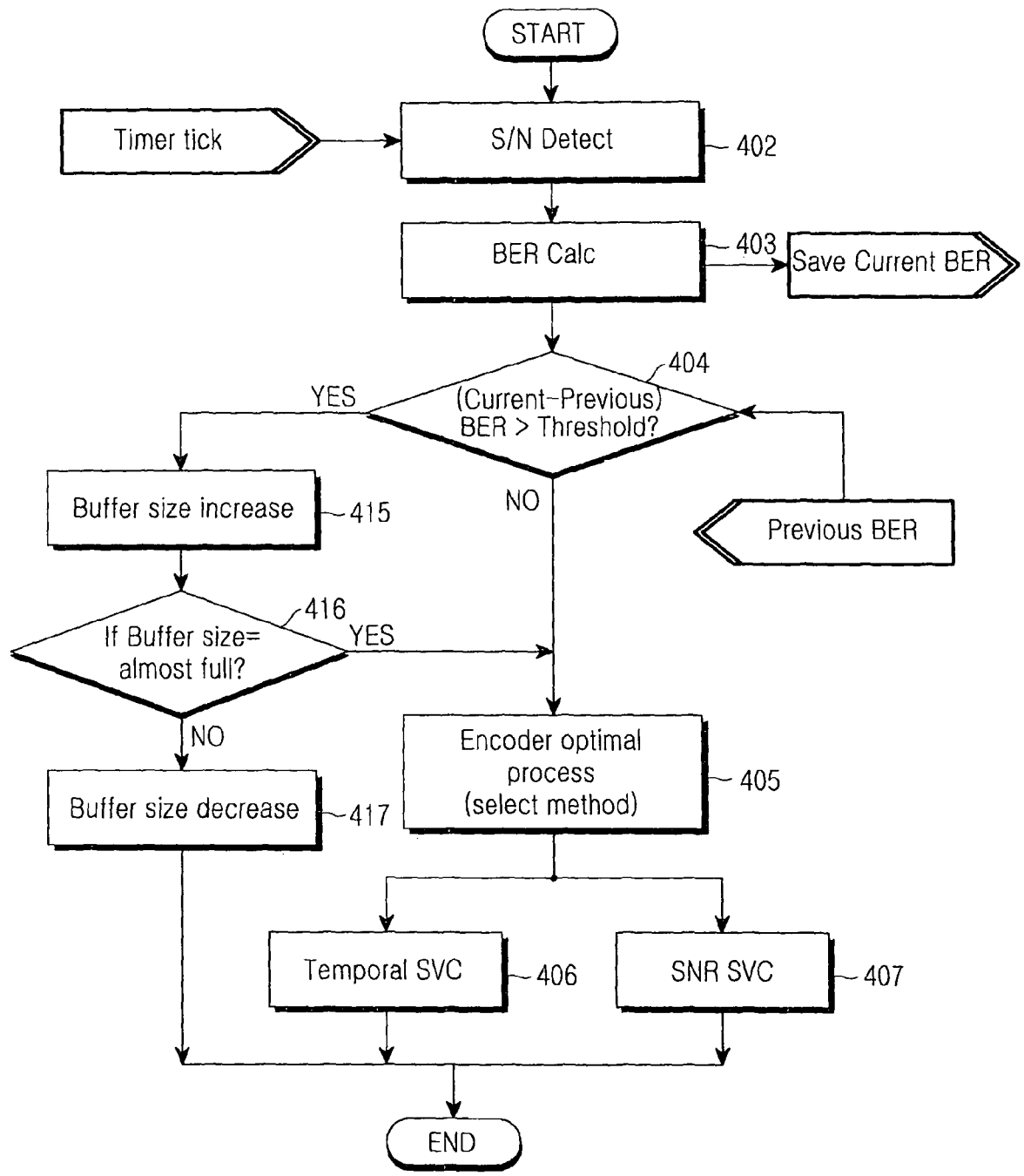
FIG. 4 is a flowchart illustrating processes for matching the compressed video data under the wireless environment according to another embodiment of the present invention.

FIG. 4 is a flowchart illustrating processes for matching the compressed video data under the wireless environment according to another embodiment of the present invention. Referring to FIG. 4, the MAC/PHY unit 14 receives periodic interruptions from a hardware timer tick to measure the SNR (or CNR) of the channel in step 402. The BER (or FER) is then calculated using the SNR value (or CNR value) measured in step 402 and stored in step 403. Next, the difference between the previous BER (or CNR) and the current BER (or CNR) is calculated to obtain the variation of the CNR per unit of time, which in turn is compared with the preset threshold in step 404. As a result of the comparison, if the variation of the BER per unit time is larger than the threshold, step 415 is carried out. If the variation of the BER per unit time is smaller than the threshold, step 405 is carried out.

In step 405, the frame transmission ratio or the bit rate, which is suitable for transmitting the multimedia data, is selected in order to reduce the frame transmission ratio or to change the quality of the video data. The temporal SVC operation or the SNR SVC operation is carried out according to the selected frame transmission ratio or bit rate in steps 406 and 407.

Step 415 indicates that the variation of the current BER per unit time is larger than the threshold. It is predicted to be fast fading through the graph shown in FIG. 2. Thus, it is determined that this fast fading lasts for a short time. Therefore, the output buffer size is changed instead of controlling the video data encoding, to absorb the affection due to fast fading. At this time, when the output buffer exceeds the available capacity, this is identified in step 416. Then, step 405 is carried out to adjust the frame transmission ratio or bit rate. However, if the output buffer does not exceed the available capacity, step 417 is carried out to reduce the buffer size after a predetermined time lapses.

The apparatus shown in FIG. 3 for matching the video data can deal with the following situations by carrying out the above-mentioned operations.

First, in the case where the terminal is blocked, if the variation of the BER per unit time exceeds the threshold at a time when the terminal is blocked, it is predicted to be slow fading. Then, if the variation is small for a desired time, it is determined to be fast fading. Second, if the terminal is far from a remote node, it is determined to be slow fading because the BER per unit time does not exceed the threshold. Third, if the terminal moves, for example, in a civic center, a multi-pathway fading is generated in the terminal due to buildings in the civic center. Thus, it is determined to be fast fading because the irregular variation of the BER appears.

As described above, the method for matching the compressed video data under the wireless fading environment detects the fading state, thereby appropriately coping with the fast fading. Thus, it is possible to stably transmit the multimedia data with satisfaction of the transmission quality.

While the invention has been shown and described with reference to a certain embodiments thereof, it will be understood by those skilled in the art that various changes in form and details may be made therein without departing from the spirit and scope of the invention as defined by the appended claims.

What is claimed is:

1. An apparatus for matching compressed video data in a wireless fading environment, the apparatus comprising:
    an encoder for encoding and outputting the video data as a compressed bit stream;
    a channel error measurement unit for measuring Signal-to-Noise Ratio (SNR) or Carrier-to-Noise Ratio (CNR) of a wireless channel;
    an encoder optimization module including
    a channel fading measurement unit for receiving the SNR or CNR, calculating a bit error ratio (BER) or a frame error ratio (FER), determining that a current fading is slow fading if a variation of the BER or FER per unit time is smaller than a preset threshold and is fast fading if a variation of the BER or FER per unit time is larger than a preset threshold,
    a buffer controller for outputting a buffer control signal in order to adjust a size of a data output buffer of the wireless channel and,
    an encoder optimization controller for outputting a control signal to reduce a frame transmission ratio or to change the quality of the video data if the channel fading measurement unit determines that the current fading is slow fading, and for outputting another control signal to the buffer controller to adjust the size of the data output buffer of the wireless channel if the channel fading measurement unit determines that the current fading is fast fading; and
    a temporal Scalable Video Coding (SVC) selector and an SNR SVC selector for selecting the frame transmission ratio or the bit rate according to the control signal output from the encoder optimization module, to provide a frame selection signal or a bit rate selection signal to the encoder.

2. The apparatus as claimed in claim 1, wherein the encoder includes an H.264/Advanced Video Coding (AVC) encoder.

3. The apparatus as claimed in claim 1, wherein the apparatus is a portable terminal.

4. A method executable in a portable terminal for matching compressed video data in a wireless fading environment, the method comprising the steps of
    periodically measuring SNR or CNR of a wireless channel within the portable terminal;
    calculating BER or FER using the measured SNR or CNR;
    comparing a variation of the calculated BER or FER per unit of time with a preset threshold;
    automatically increasing the size of the data output buffer of the wireless channel if the variation of the BER or FER per unit time is larger than the threshold as a result of the comparison; and automatically reducing a frame transmission ratio or changing the quality of the video data if the variation of the BER or FER per unit time is smaller than the threshold value as a result of the comparison.

5. The method as claimed in claim 4, wherein after the size of the data output buffer of the wireless channel increases, the frame transmission ratio or bit rate is automatically adjusted if the output buffer exceeds an available capacity.

6. A portable wireless terminal comprising:
an encoder for encoding and outputting data as a compressed bit stream;
a first measurement unit for measuring at least one of a Signal-to-Noise Ratio (SNR) or a Carrier-to-Noise Ratio (CNR) of a wireless channel;
a controller, coupled to the first measurement unit, and comprising
a second measurement unit for receiving at least one of the SNR or CNR measured by the measurement unit and calculating at least one of a BER or a FER and determining that a current fading is a fast fading if the variation of the BER or FER per unit of time is larger than a preset threshold and determining that the current fading is slow fading if the variation of the BER or FER per unit time is smaller than the preset threshold;
a buffer controller for outputting a buffer control signal in order to adjust the size of a data output buffer; and
an encoder optimization controller for outputting a control signal to reduce the frame transmission ratio or to change the quality of the data when the second measurement unit determines that the current fading is a slow fading, and providing another control signal to the buffer controller in order to adjust the size of the data output buffer when the second measurement unit determines that the current fading is a fast fading; and
a temporal Scalable Video Coding (SVC) selector and an SNR SVC selector for selecting the frame transmission ratio or the bit rate according to the control signal, to provide a frame selection signal or a bit rate selection signal to the encoder.

7. The portable wireless terminal as claimed in claim 6, the controller outputs a first control signal to reduce a frame transmission ratio or to change the quality of the data if it is determined that the current fading is slow fading, and outputs second control signal to adjust the size of a data output buffer of the wireless channel if it is determined that the current fading is fast fading.

8. The portable wireless terminal as claimed in claim 7, wherein the encoder includes an H.264/Advanced Video Coding (AVC) encoder.

* * * * *